US009332019B2

(12) United States Patent
Hoyos et al.

(10) Patent No.: US 9,332,019 B2
(45) Date of Patent: *May 3, 2016

(54) ESTABLISHMENT OF A TRUST INDEX TO ENABLE CONNECTIONS FROM UNKNOWN DEVICES

(71) Applicant: International Business Machines Corporation, Armonk, NY (US)

(72) Inventors: Carlos A. Hoyos, New York, NY (US); Steven Lingafelt, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 52 days.

This patent is subject to a terminal disclaimer.

(21) Appl. No.: 13/753,761

(22) Filed: Jan. 30, 2013

(65) Prior Publication Data
US 2014/0215558 A1 Jul. 31, 2014

(51) Int. Cl.
*H04L 29/06* (2006.01)

(52) U.S. Cl.
CPC .............. *H04L 63/105* (2013.01); *H04L 29/06* (2013.01); *H04L 63/107* (2013.01)

(58) Field of Classification Search
CPC ..... H04L 63/105; H04L 63/107; H04L 63/20; H04L 29/06
USPC ................................................ 726/1–3, 27, 4
See application file for complete search history.

(56) References Cited

U.S. PATENT DOCUMENTS

| | | | | |
|---|---|---|---|---|
| 6,286,104 | B1 * | 9/2001 | Buhle et al. | 726/4 |
| 6,295,605 | B1 * | 9/2001 | Dockter et al. | 713/166 |
| 6,519,647 | B1 * | 2/2003 | Howard et al. | 709/229 |
| 7,526,541 | B2 * | 4/2009 | Roese et al. | 709/223 |
| 7,536,548 | B1 * | 5/2009 | Batke et al. | 713/166 |
| 7,739,372 | B2 * | 6/2010 | Roese et al. | 709/223 |
| 7,954,150 | B2 * | 5/2011 | Croft et al. | 726/21 |
| 8,065,423 | B2 * | 11/2011 | Braddy et al. | 709/229 |
| 8,185,548 | B2 * | 5/2012 | Lim | 707/781 |
| 8,429,406 | B2 * | 4/2013 | Yonge et al. | 713/171 |
| 8,533,775 | B2 * | 9/2013 | Alcorn et al. | 726/1 |
| 8,544,058 | B2 * | 9/2013 | Lim | 726/1 |
| 8,572,696 | B1 | 10/2013 | Wiacek | |
| 8,595,788 | B2 * | 11/2013 | Lim | 726/1 |
| 8,694,523 | B2 * | 4/2014 | Lim | 707/758 |
| 8,805,881 | B2 * | 8/2014 | Hom et al. | 707/783 |

(Continued)

FOREIGN PATENT DOCUMENTS

WO 2012091810 7/2012

OTHER PUBLICATIONS

US NOA dated May 27, 2015 for U.S. Appl. No. 13/793,137.

*Primary Examiner* — Kambiz Zand
*Assistant Examiner* — Tongoc Tran
(74) *Attorney, Agent, or Firm* — F. Chau & Associates, LLC (57) ABSTRACT

A method of controlling access to a remote system includes granting a connecting device full access to the system upon determining the device is registered to a user, upon determining the device is not registered, determining whether the device has connected to the system before, granting the device full access to the system if the device has connected before and a trust index based on a trust level for the device and a trust level of a location the device is currently connecting from exceeds a threshold, and granting the device limited access to the system otherwise.

20 Claims, 7 Drawing Sheets

(56) References Cited

U.S. PATENT DOCUMENTS

| | | | |
|---|---|---|---|
| 2003/0217137 A1* | 11/2003 | Roese et al. | 709/223 |
| 2003/0217151 A1 | 11/2003 | Roese et al. | |
| 2005/0177752 A1* | 8/2005 | Hollander et al. | 713/201 |
| 2006/0005032 A1 | 1/2006 | Cain et al. | |
| 2006/0021001 A1* | 1/2006 | Giles et al. | 726/1 |
| 2006/0069921 A1 | 3/2006 | Camaisa et al. | |
| 2006/0117184 A1 | 6/2006 | Bleckmann et al. | |
| 2007/0124805 A1 | 5/2007 | Zhou et al. | |
| 2007/0209076 A1* | 9/2007 | Porter et al. | 726/25 |
| 2008/0028453 A1 | 1/2008 | Nguyen et al. | |
| 2008/0052762 A1* | 2/2008 | Hemsath et al. | 726/2 |
| 2008/0137593 A1 | 6/2008 | Laudermilch et al. | |
| 2008/0155094 A1 | 6/2008 | Roese et al. | |
| 2008/0155644 A1 | 6/2008 | Baranov et al. | |
| 2008/0209544 A1 | 8/2008 | Kempka | |
| 2008/0215882 A1* | 9/2008 | Coldicott et al. | 713/166 |
| 2009/0132813 A1 | 5/2009 | Schibuk | |
| 2009/0199264 A1 | 8/2009 | Lang | |
| 2010/0319063 A1 | 12/2010 | Koppolu et al. | |
| 2012/0041575 A1 | 2/2012 | Maeda et al. | |
| 2013/0198811 A1 | 8/2013 | Yu et al. | |

* cited by examiner

A method of controlling access to a remote system includes granting a connecting device full access to the system upon determining the device is registered to a user, upon determining the device is not registered, determining whether the device has connected to the system before, granting the device full access to the system if the device has connected before and a trust index based on a trust level for the device and a trust level of a location the device is currently connecting from exceeds a threshold, and granting the device limited access to the system otherwise.

A method of generating a trust index to control access to a remote system includes determining a location and a user of a device that is remotely connecting to the system, determining a trust index for the user based on a location trust level associated with the location and a device trust level associated with the device, determining an access level of the system based on the trust index, and granting the device access to the system based on the access level.

ESTABLISHMENT OF A TRUST INDEX TO ENABLE CONNECTIONS FROM UNKNOWN DEVICES

BACKGROUND

1. Technical Field

The present disclosure relates to generally to the field of computer security and more particularly to enabling unknown devices to access computer resources in a secure manner.

2. Discussion of Related Art

In some remote access (RA) systems, entry of a single RA identifier (ID) and password into a device grants the device full access to the remote system without linkage to the accessing device. For example, in such a system, the user can remotely logon from any device as long as he has the correct ID/login and password. Further, in some of these systems, it is common place for a single remote access account to be shared among several workers. This increases the risk of compromise or abuse of the ID and password and may warrant increased protections.

One current security method restricts a user's access to a remote system only to registered devices. For example, a user may register a particular device with the remote system through a process that can include verifying the user identity with personal or secret information, and installing programs or changing the device configuration to comply with the remote system security requirements. The remote system then blocks access to any un-registered devices. Thus, even if the same user enters a valid ID/password, the remote system only grants access if it recognizes the connecting device. However, this can be problematic if the user has to connect from a previously un-registered device, such as when the user's device malfunctions, or when upgrading, or testing new devices. In this example, the user would be required to register the new device in order to gain access to the system. However, the registration process may be time consuming. For example, if the user is unable to remember the information needed to register a new device, it could be hours or days before he is able to gain access to the necessary resources. However, if the control for enabling a user to connect to the system using an unknown device is too loose, a bad actor who can fake the registration process can bypass the control to gain access to the system.

Accordingly, there is a need for a mechanism to that provides unknown devices access to computer assets in a more secure manner.

BRIEF SUMMARY

According to an exemplary embodiment of the invention a method of controlling access to a remote system includes granting a connecting device full access to the system upon determining the device is registered to a user, upon determining the device is not registered, determining whether the device has connected to the system before, granting the device full access to the system if the device has connected before and a trust level exceeds a threshold, and granting the device limited access to the system if the device has connected before and the trust level does not exceed the threshold. The device may be denied access to the system entirely if the trust level fails to exceed a minimum threshold value.

According to an exemplary embodiment of the invention a method of controlling access to a remote system includes determining whether an un-registered connecting device has connected to the system before, determining whether a trust level associated with a location the device is connecting from exceeds a threshold, granting the device full access to the system if the device has connected before and the trust level exceeds the threshold, and granting the device limited access to the system if the device has connected before and the trust level does not exceed the threshold. The device may be denied access to the system entirely if the trust level fails to exceed a minimum threshold value.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Embodiments of the present invention establish a "trust index" to measure how much a new (unregistered) device can be trusted. The trust index can then be used to limit access of the device to certain assets, or trigger additional protection mechanisms. The trust index can change over time, depending on user behavior.

Figure 1:
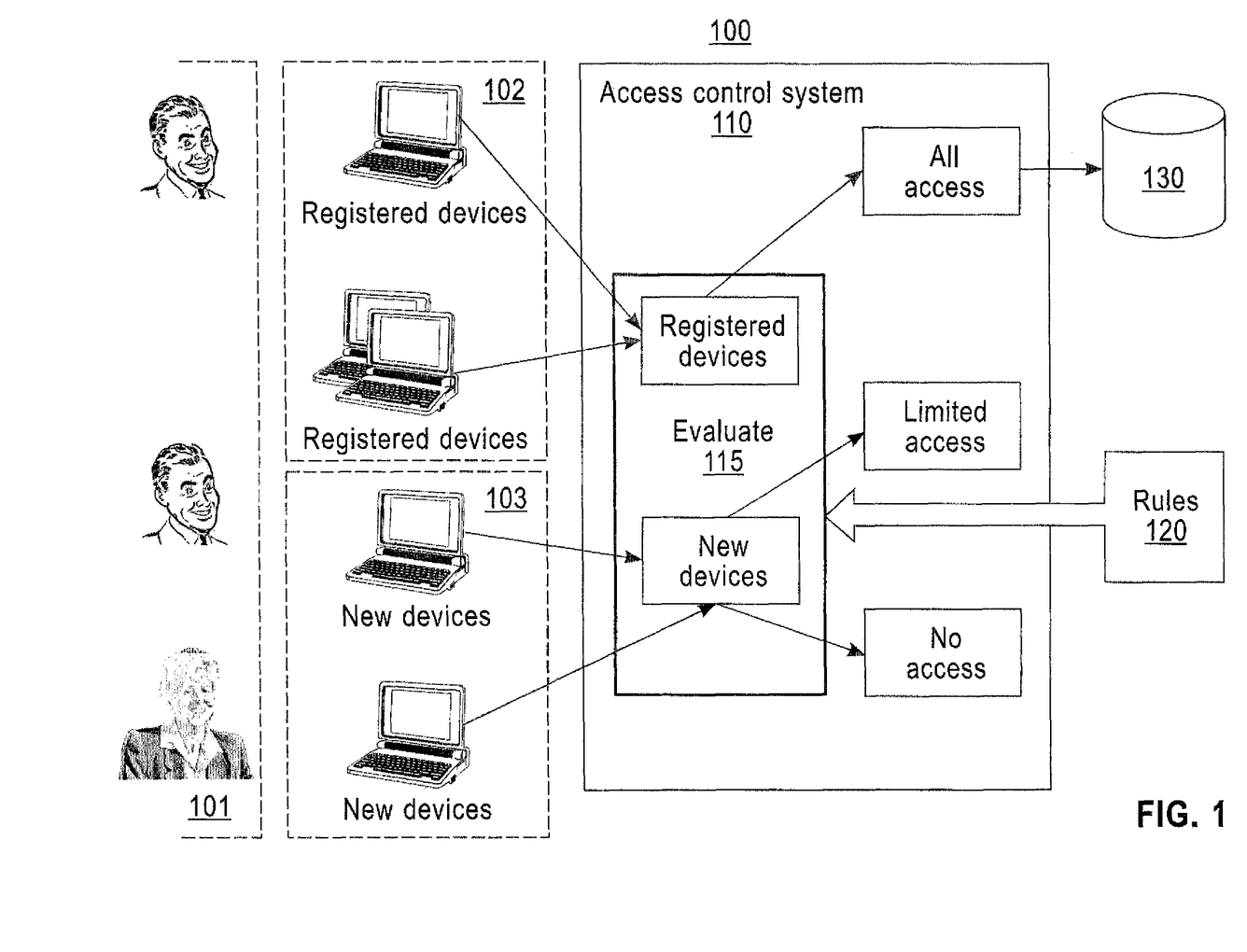
FIG. 1 illustrates a system that operates in accordance with an exemplary embodiment of the present invention.

Referring to FIG. 1, there is illustrated a system 100 that operates in accordance with an embodiment of the present invention. Actors 101 desire access to a remote resource 130. The actors 101 may include authorized users (e.g., employees) and unauthorized individuals such as hackers.

In this example, the remote resource 130 is a database. However, in alternate embodiments, the remote resource could be several resources, and include at least one computer system, computer network, computer application, additional database, computer file, folder, script, etc.

An actor 101 can attempt to access the remote resource 130 using one of the registered devices 102 or one of the new devices 103. The registered devices 102 or the new devices 103 may communicate with the access control system 110 across a computer network 1002 (e.g., see FIG. 7) such as the Internet. For example, when an actor 101 uses one of the devices 102/103 to access the access control system 110, a client program on the respective device sends a computer formatted message across the network 1002 to system 110. The message may include identifier information such as a logon name, a password, a user ID, location information (e.g., geographic position, IP address, etc.). The message may request access to the resource 130 or one or more assets of the resource 130. The access control system 110 may be a computer or an application.

In an embodiment of the system 100, when an evaluation routine 115 of the access control system 110 recognizes that access to the resource 130 is being requested by one of the registered devices 102, on behalf of the user who the device is registered to, the access control system 110 grants that device full access to the resource 130. The evaluation routine 115 may recognize the accessing device as one of the registered devices 102 by comparing an identifier (e.g., device identifier, location identifier) in computer messages sent by the user of the device across the network 1002 against a list of identifiers stored within the access control system 110 that correspond to the registered devices 102 that are registered for the user.

In an embodiment of the system 100, when the evaluation routine 115 recognizes that access to the resource 130 is being requested by a new device 103, it establishes a trust index based on predetermined rules 120, and then based on the trust index, either grants the new device 103 full access, limited access, or entirely prevents the device from accessing the resource 130.

An example of limited access with respect to a database could be to allow the device to read values from the database, but not write values. An example of limited access in a system with several resources could be to grant access to the resources with unclassified data and prevent access to the resources with classified data. An example of limited access in a system with several applications could be to grant access to applications below a security threshold level and to deny access to applications above the security threshold level. An example of limited access in a system with several internal networks could be to grant access to all machines attached to one of the internal networks, but to deny access to all machines on the remaining networks. The above are merely examples of limited access as the invention is not limited thereto.

The predetermined rules 120 may include proximity of the device to a particular location, time of attempted access, frequency of accesses by the device, etc. The trust index is essentially a risk factor that is calculated based on how previous behaviors and a current behavior of the new device compares with the rules 120. The trust index may be set to one of various trust levels, and according to the trust level, devices can be given all, limited, or no access to a particular resource 130 (e.g., network, computer, application, etc.).

In an exemplary embodiment, the trust index is calculated by observing where the new device is connecting from, and how it relates to previous connection locations for devices registered to that user. This can be used to sort new devices 103 between those connecting from or near a known or "trusted location" for a user to those that come from a never seen before location. For example, devices that connect from a known or trusted location (e.g., employee works from home or customer location, and needs to connect from a secondary un-registered device) carry a higher trust than those connecting from a new location.

The access control system 110 may include a database that stores trusted locations and connection history from that location, or more particularly trusted locations and connection history for a particular login or user. In an embodiment, the rules 120 specify ranges about the trusted location, where another location present within the range may also be considered a trusted location. For example, locations within 1000 feet, 1 mile, 1 km, etc. of a trusted location could have an equivalent trust level.

In an exemplary embodiment, the trust or risk index is refined by adjusting thresholds (e.g., distance or time since last connection from a trusted location). For example, if a device connects within 1000 feet of a trusted location, it could be given a trust level of 0.8, and for every 1000 feet thereafter its trust level could be reduced 0.1. In another example, if the device were to periodically connect from the trusted location within a certain period of time, it could maintain its trust level (e.g., 0.8), and its trust level could be reduced otherwise. For example, if the device 103 connects to the system 100 from the same location every day, it could maintain its trust level (e.g., 0.8), but then each subsequent day it fails to connect to the system from the same location, its trust level could be reduced some arbitrary level or percentage. Thus, if the device does not connect to the system from the same location in time, the trust of that location will fade away.

In an exemplary embodiment, the specific degree of trust for a device can also be based on the physical location with all other things being held constant. For example, if user 1 connects with a new device 103 from the same physical location as registered devices and user 1 is in a low risk country, then the degree of trust is higher. For example, the trust level associated with the trusted location (e.g., 0.8) could be adjusted by a low risk country modifier (e.g., +0.1) to result in the higher degree of trust (e.g., 0.9). If user 2 also connects with a new device 103 from the same physical location as registered devices and user 2 is in a high risk country, then the degree of trust is lower. For example, the trust level associated with the trusted location (e.g., 0.8) could be adjusted by a high risk country modifier (e.g., −0.1) to result in the lower degree of trust (e.g., 0.7).

If a device has a low enough risk, it can be added to a list of devices associated with the user. These devices may be referred to as known devices rather than trusted devices. This enables locations for a new device to be added to a user profile (e.g., known location), but with lower and different trust levels.

Embodiments of the invention enable new devices to access the resource 130, at least to a limited extent, without requiring the user to register that device.

Figure 2:
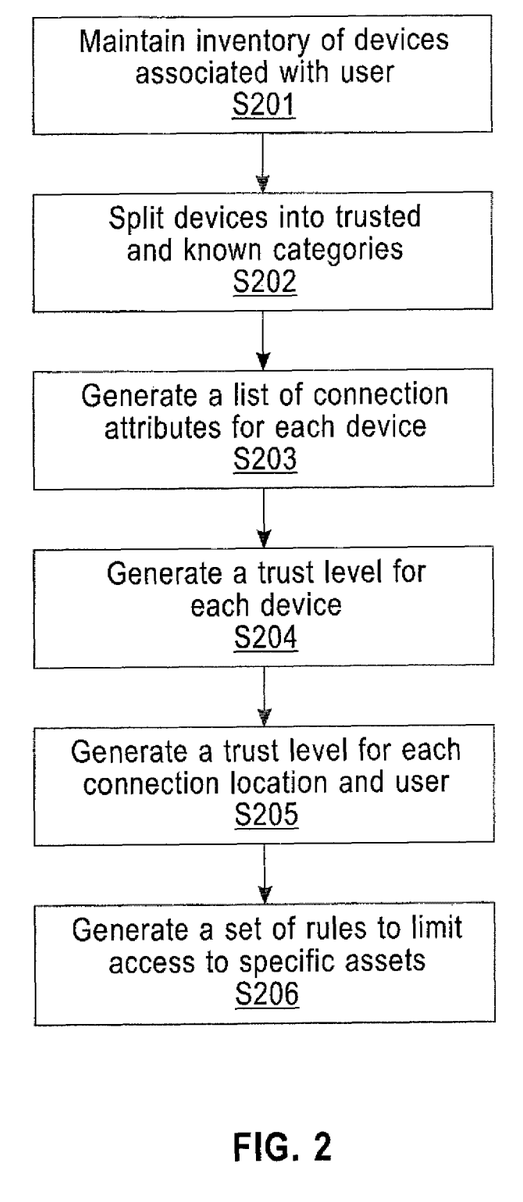
FIG. 2 illustrates a method that may be performed during a preparation phase prior to determining what type of access to grant a connecting device, according to an exemplary embodiment of the invention.

An embodiment of the invention may include a preparation phase and an operation phase. A portion of the preparation phase is illustrated in FIG. 2 according to an exemplary embodiment of the invention.

For each user of the system 100, an inventory is maintained of devices known to be associated with this user (S201). The inventories may be maintained in various ways, such as device registration (e.g., devices assigned to the user by his employer), end point agents installed in user device, or access logs from applications that have strong authentication protections.

The devices can then be split into two categories: those registered to a user (e.g., trusted), and those devices not registered, but known to be used by a user who has another properly registered device (e.g., a personal computer, laptop, tablet, smartphone, etc.) based on user behavior (e.g. where the devices are connecting from, how they are connecting, etc.) (S202). While the splitting is described here as occurring in the preparation phase, the list of these categories may be updated thereafter periodically based on user behavior.

Next for each device, a list of connection attributes is created (S203). As an example, a connection attribute in the list could be the last connection place (e.g., an Internet Protocol Address, a Geographic location, etc.) the device connected from. In another example, a connection attribute in the list could be the last applications accessed by the device, the durations in which they were accessed, etc.

Next for each device, a device trust level ("Device_trust") is created (S204). As an example, the device trust level can be a value between 0 and 1, where 0 means that the device is not trusted and 1 means that the device is trusted completely. In this example, registered device would have a device trust index of 1.

Next for each connection location and user, a location trust level ("Location_trust") is created (S205). As an example, the location trust level can be a value between 0 and 1, where 0 means that the location is not trusted and 1 means that the location is trusted completely.

Next, a set of rules (e.g., 120) is created to limit access to specific assets (e.g., resource 130) (S206). For each asset to protect, a tuple (pair) is created (e.g., {asset, mintrust}). The parameter asset identifies the asset and the parameter mintrust refers to the minimum trust level that a device needs to have before it can access the resource (e.g., 130).

The preparation phase may include the establishment of one or more of the below described thresholds.

In an embodiment, a first threshold is established that determines the minimum trust level for a non-registered device before it is allowed to access/connect to the registered locations ("Device_minimum_trust_level").

In an embodiment, a second threshold is established that determines the trust increase that a location gets when trusted devices connect from it ("Increment_from_trust_device").

In an embodiment, a third threshold is established that determines the minimum trust level for a location for the location to be trusted ("Location_minimum_trust_level").

In an embodiment, a fourth threshold is established that determines the trust increase that a device gets when connecting from a trusted location ("Increment_from_trust_location").

In an embodiment, a fifth threshold is established that represents the degree of increased trust that a given location is given because the location has been used previously to access the resource 130 (e.g., a network, database, computer, application, etc.) ("Location_extension").

In an embodiment, a sixth threshold is established that represents how quickly the system 110 forgets a location that a user has connected from ("Location_fade"). For example, if the Location_fade is 1 day, the trust level of a location for a user could be reduced an arbitrary factor (e.g., 0.1) every day the location was not connected from by the user, until it is considered either an unknown location or an un-trusted location.

In an exemplary embodiment, an adjusting factor may be present that is used to normalize the device trust level so it can be compared against the location minimum trust level value for each asset.

Figure 3:
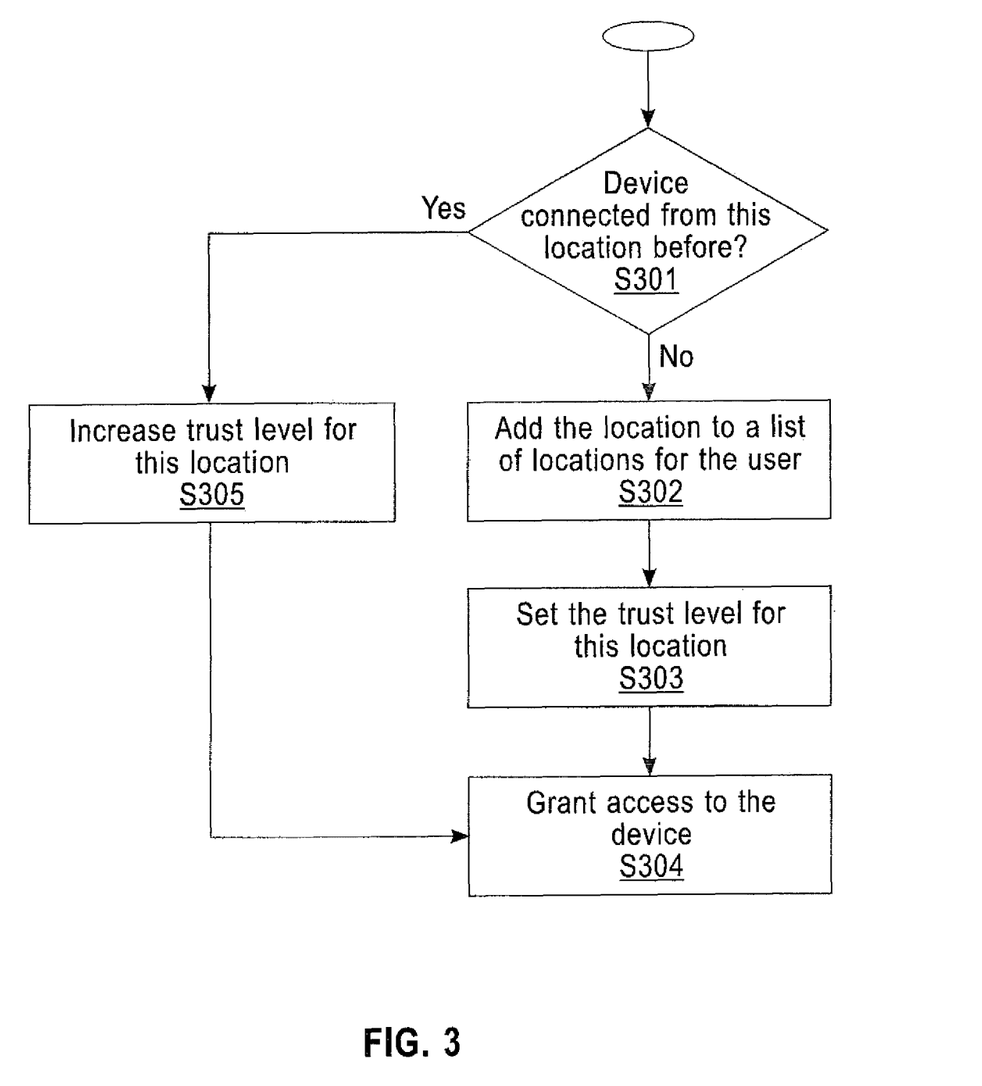
FIG. 3 illustrates a method that is used to grant access to a registered device according to an exemplary embodiment of the invention.
Figure 4:
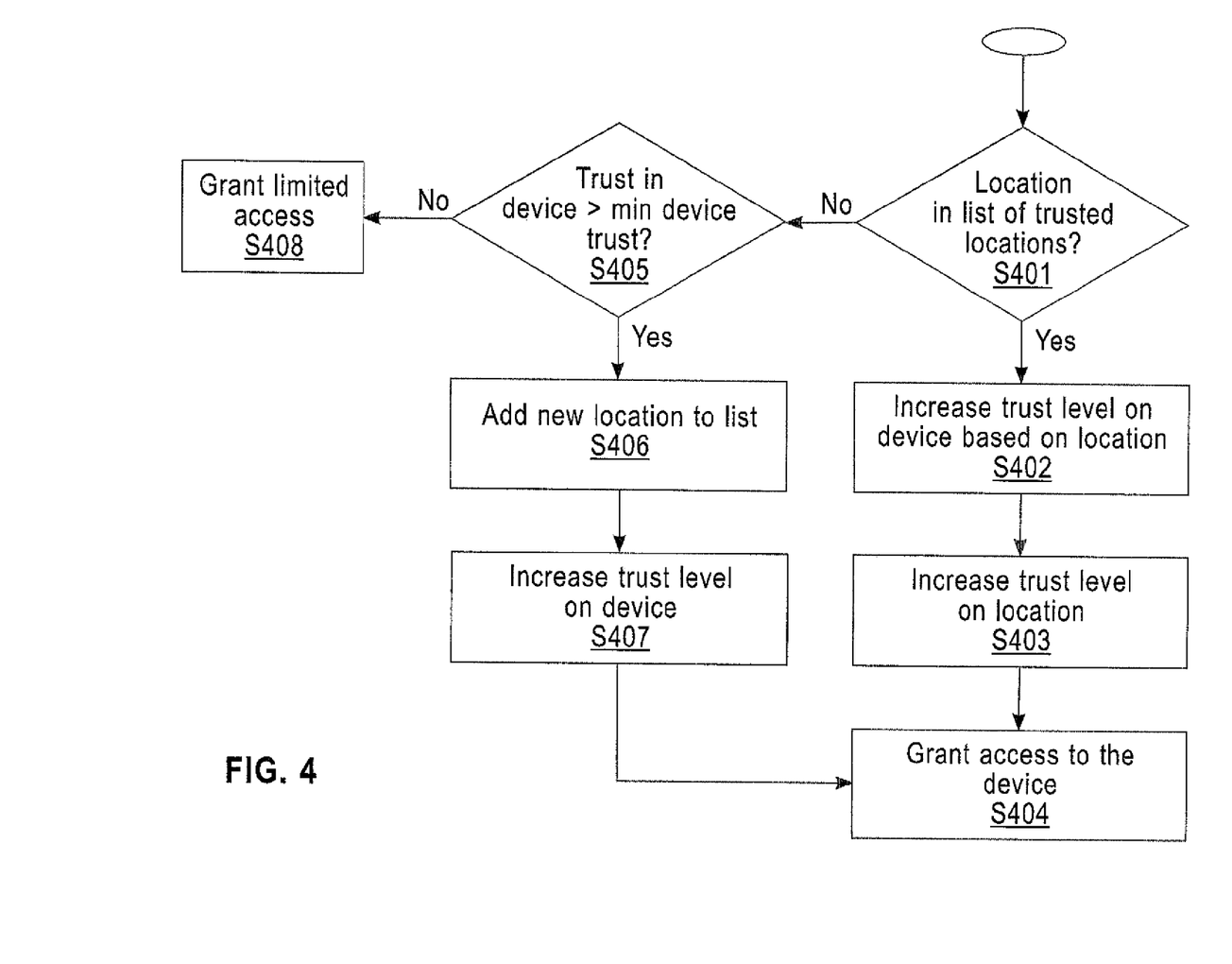
FIG. 4 illustrates a method that is used to determine whether what type of access to grant to an un-registered device according to an exemplary embodiment of the invention.
Figure 5:
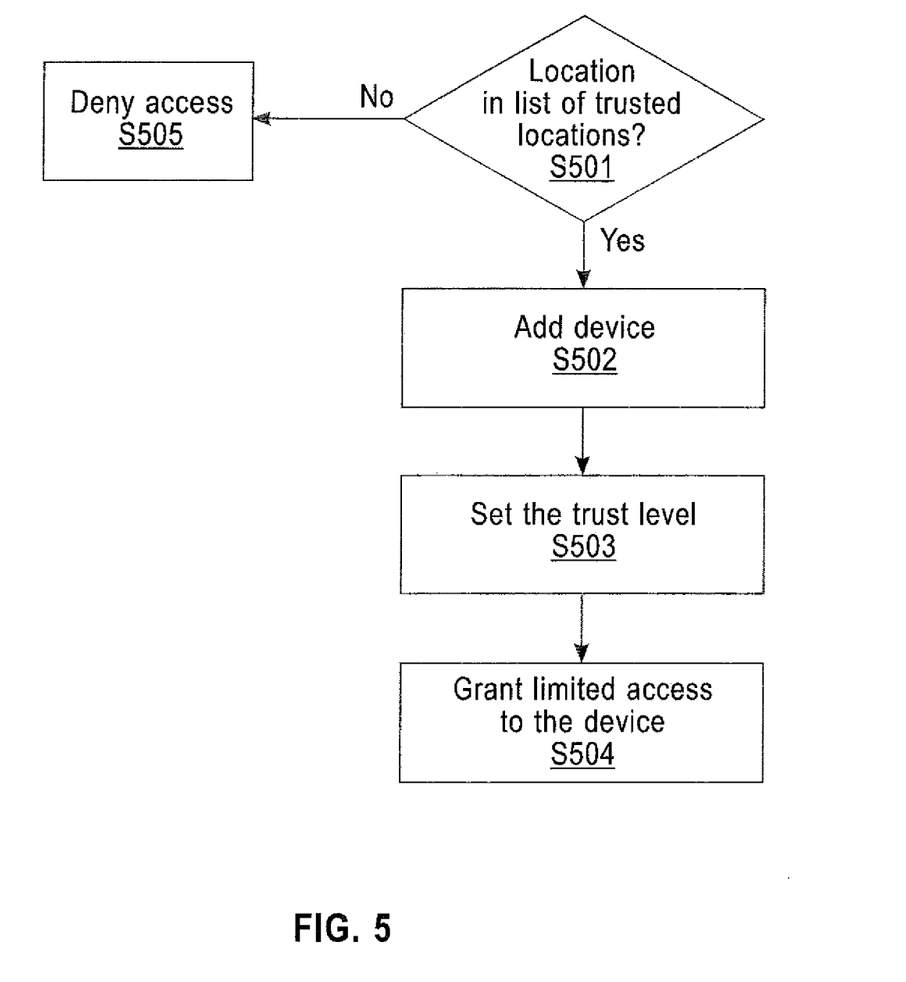
FIG. 5 illustrates a method that is used to determine what type of access to grant an un-registered device according to an exemplary embodiment of the invention.

In an exemplary embodiment, the operational phase includes at least one of three cases, which are illustrated by the methods of FIG. 3-5, respectively.

The method of FIG. 3 is executed when it is determined that access to the asset or resource (e.g., 130) is being attempted from a registered device (e.g., device is registered to a particular user with system 110). In this case, the device is considered a trusted device (i.e., "Device_trust=1).

Referring to FIG. 3, the method includes determining if a user had not connected from this location before (i.e., new location or not in {location, user}) (S301). If it is a new location, then the method adds the location to a list of locations for the user (e.g., adds a {location, user} pair to the list of trusted locations for the user) (S302), sets the trust index for this location and user (e.g., "Location_trust"=1) (S303), and grants access to the device (S304). The order of steps S302-S304 need not be sequential, as the granting of access could occur before the location is added or before the trust index for the location is set.

If it is not a new location (e.g., user had previously connected from this location, i.e., location in {location, user} list), the method increases the trust level for this location and user (e.g., previous_trust+increment_from_trust_device) (S305), and then grants access to the device (S304). The order of steps S305 and S304 need not be sequential as the granting of access may occur before the trust index is increased.

The method of FIG. 4 is executed when it is determined that access to the asset or resource (e.g., 130) is being attempted from an un-registered device (e.g., device is not registered to a particular user with system 110), but device has previously accessed the resource (e.g., database, network, application, etc.) (i.e., Device_trust>0).

Referring to FIG. 4, the method includes determining whether the location is in list of trusted locations that is trusted greater than the minimum required trust level for that location (i.e., Location_trust>Location_minimum_trust_level) (S401).

If the location is in the list, the method increases the trust level on the device based on the location (e.g., increased by increment_from_trust_location) (S402), increases the trust level on the location (e.g., by Location_extension) (S403), and grants access to the device (S404). The above steps of S401-S403 need not be executed sequentially as the granting of access to the device could occur first as an example.

If the location is not in the list, the method proceeds by determining whether the level of trust in the device is greater than some minimum device trust level (i.e., is device_trust>Device_minimum_trust_level?) (S405).

If the level of trust is greater than the minimum device trust level, the method adds the new location to the list (S406), increases the trust level on the device (e.g., increased by increment_from_trust_device) (S407), and grants access to the device (S404). The above steps of S405-S407 need not be executed sequentially as the granting of access to the device could occur first as an example.

If the location is not in the list and the trust level of the device is not greater than the minimum device trust level, the method grants the device limited access to the resource (S408). The limited access may be determined based a trust index generated from factors such as the amount of trust in the device and the amount of trust in the location. For example, if the amount of trust in the device is 0.70 and the amount of trust in the location is 0.60, one could use an average trust of 0.65 compared against minimum thresholds required for accessing each asset to determine what the limited access entails.

The below exemplary Table 1 illustrates assets with their threshold access levels and which assets a trust index of 0.65 would have access to. Further, weights may be applied to the factors the trust index is based on so that more importance is placed on one of the factors in determining whether to grant or deny access to the device.

TABLE 1

| Asset | Trust Index Required | Access |
|---|---|---|
| Network A | 0.8 | Denied |
| Network B | 0.6 | Granted |
| Computer A | 0.8 | Denied |
| Computer B | 0.6 | Granted |
| Database A | 0.8 | Denied |
| Database B | 0.5 | Granted |
| Application A | 0.9 | Denied |
| Application B | 0.4 | Granted |

The method of FIG. 5 is executed when it is determined that access to the asset or resource (e.g., 130) is being attempted from an un-registered device that has never connected before, but is connecting from a location that a known device has previously connected from.

Referring to FIG. 5, the method includes determining if the location is in a list of trusted locations for a user with a trust level greater than a minimum location trust level (e.g., is location_trust>location_minimum_trust_level?) (S501). If the location is in the list, then the method adds the new device (S502) and sets its trust level (S503). An un-registered device that has never connected before, but is connecting from a location that a known device has previously connected from may be given an arbitrary device trust level (e.g., 0.4), and incremented depending on the trust increment associated with the location (e.g., increment_from_trust_location). For example, if the arbitrary trust level is 0.4 and the increment is 0.1, the resulting trust level for the device would be 0.5. Then limited access is granted to the device based on the resulting trust level of the device and trust level of the location (S504). If the location is not in the list, then the device is denied access entirely (S505).

In an exemplary embodiment, trusted locations loose their trust over time. For example, the amount of trust in a location may be periodically decreased by a factor (e.g., location_fade) unless a device connects from that location within some minimum period of time. The access control system 110 may run a process in the background that periodically checks each location and whether a device within that location has connected within the prescribed amount of time, and if not, decreases the trust level for that location by the factor.

In an exemplary embodiment, access by a device to a resource is denied when the trust in the device times the trust in the location time an adjustment factor is less than a predetermined minimum trust level, and granted otherwise.

Figure 6:
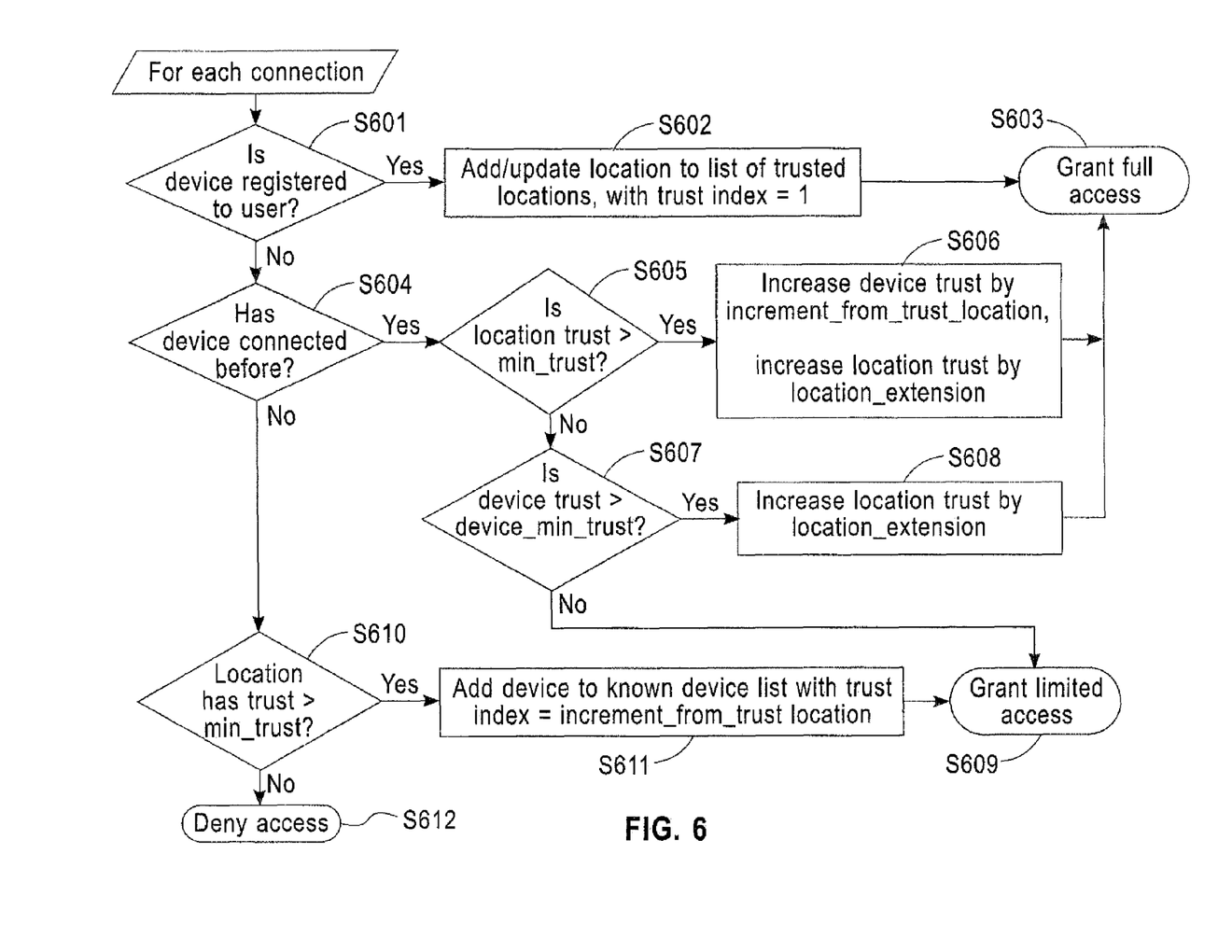
FIG. 6 illustrates a method used to determine whether to grant full access, limited access, or deny access to a connecting device according to an exemplary embodiment of the invention.

FIG. 6 illustrates a method used to determine whether to grant full access, limited access, or deny access to a connecting device according to an exemplary embodiment of the invention. The method may be executed for each connection caused by a connecting device. The method determines whether a device is registered to a user (S601). This determination may be made by comparing a device identifier received in a computer message across a computer network from the device against a list of registered devices for the user. For example, each time a new device is registered for a user with the access control system 110, its device identifier can be added to the list of registered devices for that user. The list may be created the first time a user registers a device and then new entries may be added each time the user registers a new device.

If the device is a registered to a user, the location from which the device is connecting from is added to a listed of trusted locations with a highest trust level (e.g., 1) (S602). If the list does not currently exist, the list is created and associated with the user. If the list already exists for the user and the location is substantially different from an existing location in the list, the new location as added to the list. If the list exists for the user and the location is similar to one that already exists in the list, the similar location could be updated with the new location. If the list exists for the user and the location is the same as one that already exists in the list, the new location may be ignored. The device is then granted full access to one or more resources of the system (S603). The granting of access to the device may occur before creation or update of the list.

If the device is not registered to a user, it is determined whether the device has connected to the system before (S604). For example, if a device has accessed resources of the system, it is more likely that the device can be trusted. This determination may be made by comparing a location or location information in a computer message received from the device across a network (e.g., the Internet) against a list of known locations. The location information may be a geographic position or an IP address from which a location can be derived.

Next a determination is made as to whether the trust level associated with the location from which the device is connecting is greater than a minimum threshold location trust level (S605). For example, a device connecting from a location that is trusted 70% of the time could be granted more access than the same device that is connecting from a location that is only trusted 50% of the time. If the location from which the device is connecting is deemed to be trustworthy enough, the trust level of the device and the trust level of the location are increased (S606), and the device is granted full access to the system (S603). If the location is not deemed to be trustworthy enough, it is determined whether the trust level of the device is greater than a minimum threshold device trust level (S607). If the trust level of the device is high enough, the trust level of the location is increased (e.g., by a location_extension factor) (S608), and the device is granted full access to the system (S603). The granting of full-access to the device may occur before the trust levels are increased. If both the location and the device were deemed not trustworthy enough, the device can either be granted limited access (S609) or denied access entirely.

If the device is not registered, and the device has not connected before, a determination is made as to whether a trust level of the location from which the device is connecting from is greater than minimum trust threshold (S610). If the trust level of the location exceeds this level, the device is added to a list of known devices (S611). The trust level associated with the location may also be incremented. Further, the device is granted limited access (S609). The device may be granted the limited access prior to adding the device or incrementing the trust level of the location. The device is denied access to the system if the device is not registered, the device has not connected before, and the trust level of the location from which the device is connecting from does not exceed the minimum trust threshold (S612).

Figure 7:
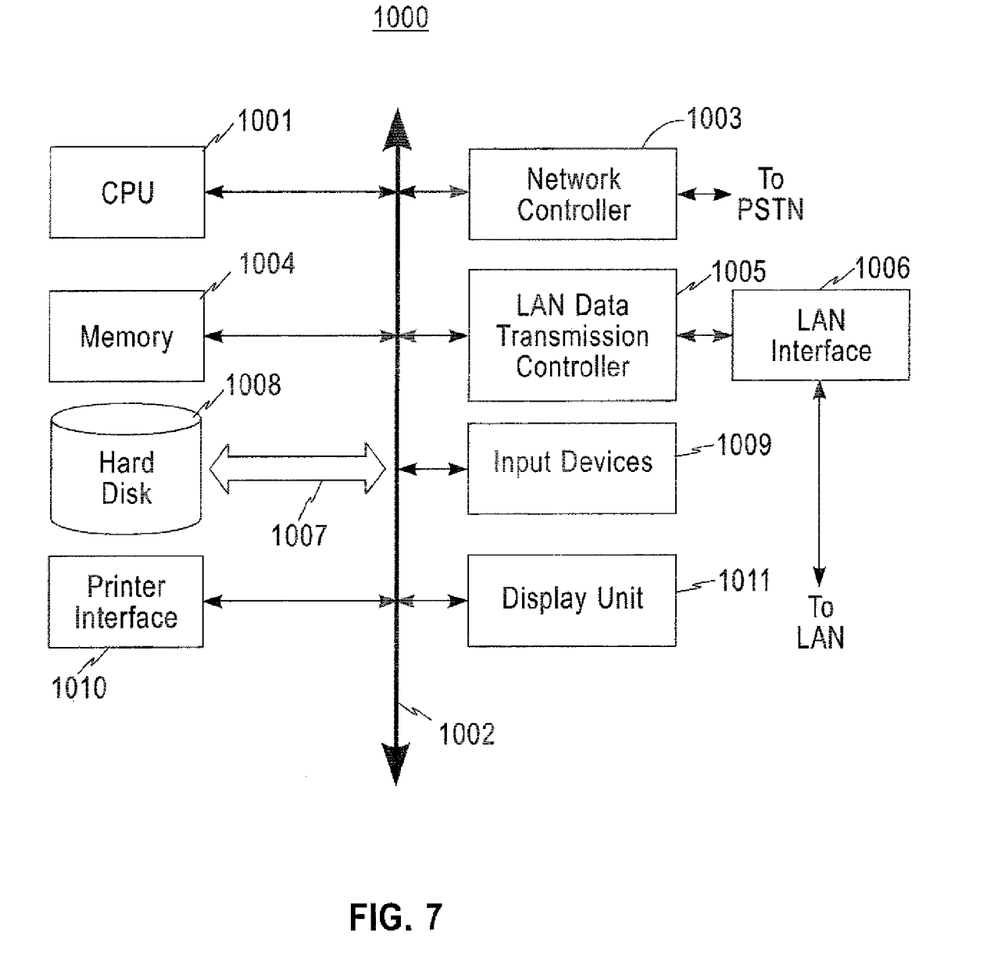
FIG. 7 illustrates an example of a computer system capable of implementing methods and systems according to embodiments of the disclosure.

FIG. 7 illustrates an example of a computer system, which may execute any of the above-described methods, according to exemplary embodiments of the invention. For example, the access control system 110 of FIG. 1 and the methods of FIGS. 2-6 may be implemented in the form of a software application running on the computer system. Further, portions of the methods may be executed on one such computer system, while the other portions are executed on one or more other such computer systems. Examples of the computer system include a mainframe, personal computer (PC), a microprocessor, a handheld computer, a server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. For example, the registered devices 102 or unknown devices 103 may send computer message across the LAN or the Internet to the system 1000 that includes the access control system 110. As shown, the system 1000 may be connected to a data storage device, for example, a hard disk 1008 (e.g., a digital video recorder), via a link 1007. CPU 1001 may be the computer processor that performs the above described methods.

Embodiments of the invention can be implemented as part of managed security services or as part of access control systems (e.g., Websphere Connect (WECM)), or application access control systems, which are used on application products.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of controlling access to a remote system, the method comprising:
   granting a connecting device full access to the system upon determining the device is registered to a user;
   upon determining the device is not registered, determining whether the device has connected to the system before;
   increasing the trust level of the device when the device has connected before and a trust level of a location the device is currently connecting from exceeds a certain threshold;
   granting the device full access to the system if the device has connected before and a trust index based on the trust level for the device and the trust level of the location the device is currently connecting from exceeds a trust index threshold, and granting the device limited access to the system otherwise; and
   Execute a background process that periodically updates the trust level of the location based on whether devices within that location have connected within a prescribed amount of time.

2. The method of claim 1, further comprising denying the device access entirely to the system if the trust index fails to exceed a minimum threshold.

3. The method of claim 1, wherein determining whether the device is registered comprises comparing a device identifier received in a computer message across a computer network from the device against a list of registered devices for the user.

4. The method of claim 1, further comprising increasing the trust level of the location when the device has connected before and the trust level of the device exceeds a certain threshold.

5. The method of claim 1, further comprising denying the device access entirely to the system if the device has not connected before, and the location the device is connecting from is unknown.

6. The method of claim 1, further comprising incrementally decreasing the trust level of the location over time for the user, as long as a registered device has not connected from the location.

7. The method of claim 1, further comprising incrementally decreasing the trust level of the location over time, as long as a device with a trust level exceeding a certain threshold for that user has not connected from the location.

8. The method of claim 1, further comprising denying the device access entirely to the system if the device has not connected before and the trust level of the location the device is connecting is below a location threshold.

9. The method of claim 1, wherein determining whether the device has connected to the system before comprises comparing the location from which the device is connecting against a list of known locations.

10. The method of claim 9, further comprising adding the location the device is connecting from to a list of trusted locations if the device is registered to the user, wherein the trusted locations are more trusted than the known locations.

11. A method of generating a trust index to control access to a remote system, the method comprising:
    determining a location and a user of a device that is remotely connecting to the system;
    Execute a background process that periodically updates a location trust level associated with the location based on whether devices within that location have connected within a prescribed amount of time, the process configured to increasing the location trust level when the device has connected before and a device trust level of the remote device exceeds a certain threshold;
    determining a trust index for the user based on the location trust level associated with the location and the device trust level associated with the device;
    determining an access level of the system based on the trust index; and
    granting the device access to the system based on the access level.

12. The method of claim 11, wherein the determining of the location comprises extracting location information from a computer message received by the device across a computer network and deriving the location from the location information.

13. The method of claim 11, wherein the access level grants the device full access to the system if the device has connected before and the trust index exceeds a threshold.

14. The method of claim 11, wherein the access level grants the device limited access to the system if the device has connected before and the trust index does not exceed the threshold.

15. The method of claim 11, further comprising increasing the location trust level when the device has connected before and the device trust level exceeds a certain threshold.

16. The method of claim 11, wherein the access level denies the device access to the system entirely if the trust index fails to exceed a minimum threshold.

17. The method of claim 11, wherein the access level denies the device access to the system if the device has not connected before.

18. The method of claim 11, wherein the access level denies the device access to the system entirely if the device has not connected before and the location trust level is below a certain threshold.

19. A method of controlling access to a remote system, the method comprising:
    determining whether an un-registered connecting device has connected to the system before;
    execute a background process that periodically updates a location trust level associated with a location based on whether devices within that location have connected within a prescribed amount of time, the process configured to increase the location trust level when the device has connected before and a device trust level of the device exceeds a first threshold;
    determining whether the location trust level associated with the location the device is connecting from exceeds a second threshold;
    granting the device full access to the system if the device has connected before and the location trust level exceeds the second threshold; and
    granting the device limited access to the system if the device has connected before and the location trust level does not exceed the second threshold.

20. The method of claim 19, wherein determining whether the device has connected to the system before comprises comparing a location in a computer message received across a network from the device against a list of known locations.

* * * * *